June 8, 1926.

W. SCHMID

ANTIBACKLASH REEL

Filed August 24, 1925

1,587,557

Inventor
William Schmid
By [signature]
Attorneys

Patented June 8, 1926.

1,587,557

UNITED STATES PATENT OFFICE.

WILLIAM SCHMID, OF COLDWATER, MICHIGAN.

ANTIBACKLASH REEL.

Application filed August 24, 1925. Serial No. 51,932.

This invention relates to an anti-backlash fishing reel that may be advantageously used for bait casting purposes, the reel including an anti-backlash mechanism which is compactly arranged in the reel and adapted to prevent line entanglement on the reel spool.

The anti-backlash mechanism includes a novel brake shoe member normally under spring pressure to retard rotation of the reel spool. The spring or springs associated with such brake shoe member are susceptible to wear and ordinarily it is necessary to disassemble the parts of the reel in order to adjust the spring for further use after it has weakened and fails to provide a desired degree of tension on the brake shoe member. To obviate the necessity of taking apart the reel, I have devised means operable exteriorly of the reel for increasing or decreasing the tension of a spring within reel and associated with the brake shoe member.

My invention further aims to provide a novel mounting for a line bail adapted to be actuated by a line to shift a brake shoe member and release a reel spool so that it may freely revolve.

My improvements will be hereinafter specifically described and then claimed, and reference will now be had to the drawing, wherein—

Figure 1:
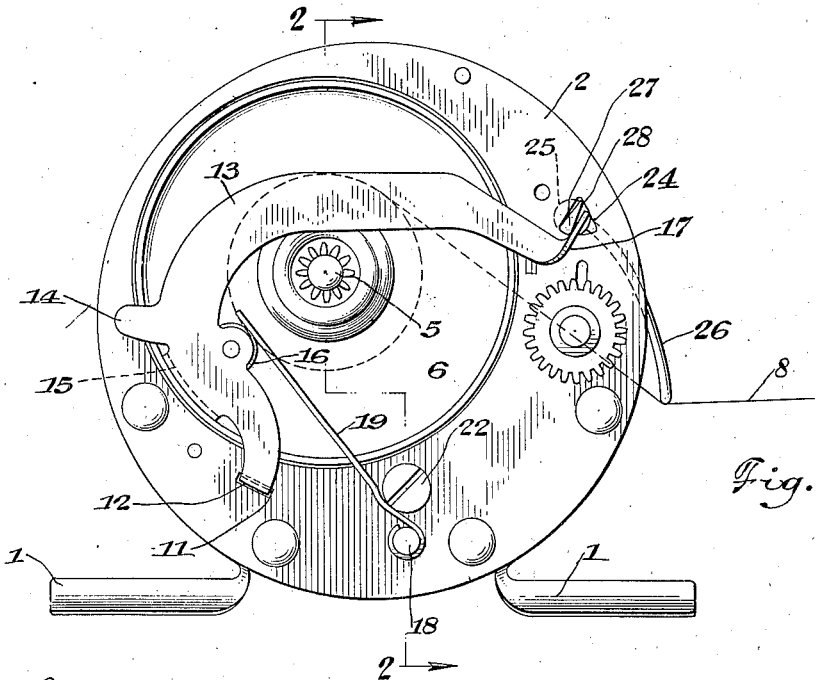
Figure 1 is an end view of a reel with the gear housing thereof removed.
Figure 2:
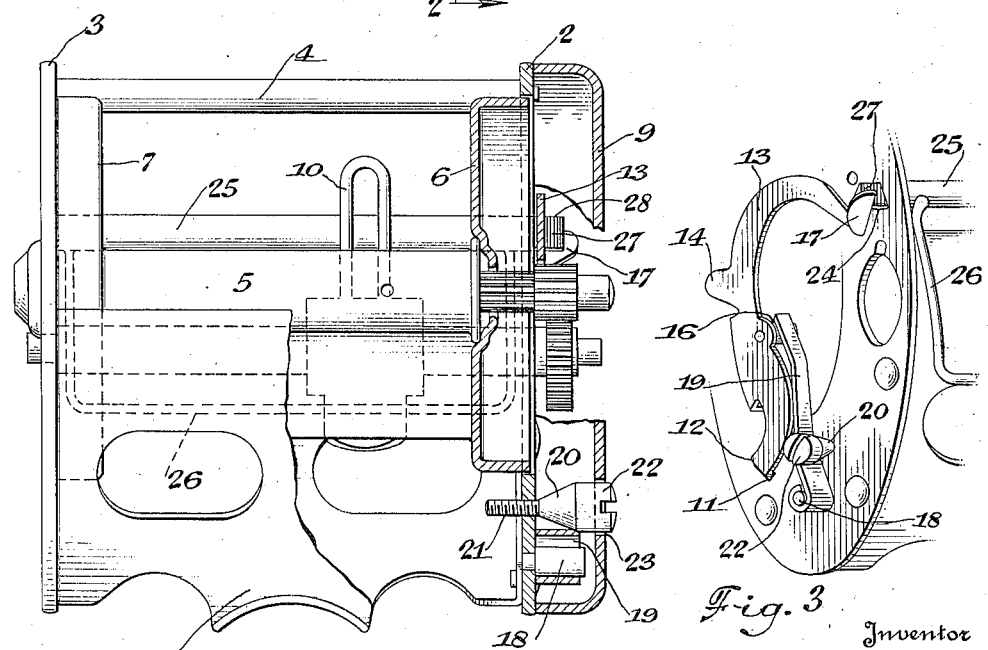
Fig. 2 is a rear elevation of the reel, partly broken away and partly in section.
Figure 3:
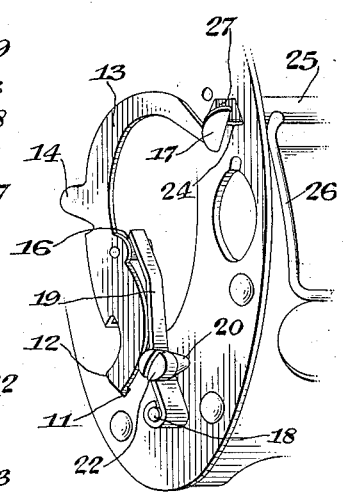
Fig. 3 is a perspective view of one of the reel heads.

In the drawing, the reference numeral 1 denotes a reel seat member and suitably attached thereto are reel heads 2 and 3 connected by pillars 4 and other elements so as to form a durable and rigid frame for a line spool 5 journaled in the heads 2 and 3. The spool 5 has a cup shaped end members 6 and 7, and a line 8 is attached to the spool and adapted to be wound thereon by a conventional form of gearing operatively supported in a gear housing 9 attached to the head 2 of the reel. A conventional form of level wind mechanism 10 may form part of the reel and be operated in the usual manner. So far I have described what may be considered an ordinary type of level wind fishing reel, and reference will now be had to the anti-backlash feature of the reel.

The head 2 of the reel is provided with an opening 11, and loosely mounted in the opening is the angular end 12 of a flat brake shoe member 13, said member being mounted against the reel head 2 so as to be somewhat guided thereby. The brake shoe member is curved or of irregular shape in order to provide clearance for the spool operating mechanism, and said brake shoe member includes a guide extension 14, an arcuated shoe 15, a roller bearing 16, and an angular end 17, which is opposite the angular end 12 of the brake shoe member. The arcuated shoe 15 and the roller bearing 16 are in proximity to each other, and adjacent the loosely mounted or pivoted end of the brake shoe member, so that the remaining portion of the brake shoe member will serve as a long lever adapted to be actuated at the angular end 17 thereof. The brake shoe 15 extends into the cup-shaped end member of the spool 5 and normally engages the annular wall of said member to retard rotation of the spool 5.

Suitably anchored on the side of the head 2, as at 18, is a substantially flat spring 19 which presses on the roller bearing 16 and holds the brake shoe 15 in engagement with the spool. This spring, adjacent its anchored end, is engaged by a tapered member 20 having a screw portion 21 and a screw head 22, said screw portion being adjustable in the head 2, with the screw head 22 extending into an opening 23 in the gear housing 9 which is suitably secured to the reel head 2. The tapered member 20 constitutes means for increasing or decreasing the tension of the spring 19 relative to the brake shoe member, and said tapered member has been shown in its extreme innermost position in the drawing. If the tapered member 20 is screwed outwardly, the tension of the spring 19 on the roller bearing 16 may be reduced, and it will be noted that this spring adjusting means may be adjusted without removing the gear housing 9. I believe this to be a distinct advantage compared to those reels which must be taken apart to adjust an anti-backlash mechanism.

The reel heads 2 and 3 are provided with transversely alining openings with one of the openings 24 triangular in shape. Fulcrumed in these openings are the end portions of a transverse member 25 supporting a bail 26. One of the end portions of the member or bail is designated 27 and this end portion extends through the triangular shaped opening 24 and is itself triangular in cross section, so that it will present a fulcrumed edge 28 to ride against the wall of the opening 24 and rock in said opening to impinge against the angular end 17 of the brake shoe member 13 and shift said brake shoe member sufficiently to move the brake shoe 15 out of engagement with the spool end member 6. Such movement stresses the spring 19, so that immediately upon the brake shoe member being released by the bail 26 assuming normal position, the brake shoe 15 will again exert pressure against the spool end member 6 to retard rotation thereof.

The line 8 extends under the bail 26 or in an operatable relation thereto so that when casting the line 8, it will raise the bail 27 by reason of the line becoming more or less taut. Ordinarily when casting and a lure striking the water the spool is thumbed to prevent a backlash, but this is unnecessary with my reel, because when the line 8 becomes momentarily slack incident to a lure striking the water, the bail 27 is released and restored to normal position under the influence of the spring pressed brake shoe member 13. Release of this brake shoe member, which has been held in a retracted position by the raised bail 27, permits the brake shoe 15 to engage the spool end member 6, and immediately stop the rotation of the spool so that there cannot be any backlash or line entanglement on the spool. The pressure of the brake shoe member on the spool end member is not so great as to prevent rotation of the spool by a lure sinking in the water, if such tackle is used, and assuming that the lure sinks and reaches a stage of rest, then there is a brake action against the spool, which will prevent a stream of water from washing the line to the extent of unwinding it from the spool. Should the lure be taken by a fish, the line is drawn taut with the result that the bail is raised and the brake shoe member 13 shifts to permit of free rotation of the reel spool and playing out of the line until controlled by the operator of the reel. Winding in a taut line renders the anti-backlash mechanism inactive and does not interfere in the least with the level wind mechanism of the reel.

With the brake shoe member 13 substantially flat against the head 2 of the reel, one end of the brake shoe member pivoted in the reel head, and the opposite end of the brake shoe member engaging the bail end portion, it is practically impossible for the brake shoe member to become accidentally displaced or interfere with the spool driving or operating mechanism of the reel.

It is thought that the operation of the anti-backlash mechanism may be apparent without further description, and I would have it understood that this mechanism is applicable to various types of reels, and that the structural elements are susceptible to such changes as are permissible by the appended claims.

What I claim is:—

1. In an anti-backlash fishing reel wherein the pressure of a spring in the head of the reel is utilized as a force for retarding the action of the reel,—means having a screw portion in the head of the reel adapted for increasing the pressure of the spring, said means including a tapered member in engagement with said spring and adapted to be adjusted relative thereto.

2. In an anti-backlash fishing reel wherein a rotary spool has a cup shaped end member normally engaged by a spring pressed brake shoe member bearing outwardly in a radial direction against said spool end member;—means adapted to retract said shoe member to release the spool, said means comprising a fulcrumed bail having an end formation which rocks against the reel and shifts said brake shoe member inwardly from said spool end member.

3. In an anti-backlash fishing reel wherein a rotary spool is normally engaged by a spring pressed brake shoe member, and wherein said reel has a head provided with a triangular shaped opening;—means adapted to retract said shoe member to release the spool, said means comprising a fulcrumed bail having an end formation rockable in the triangular shaped opening of the reel head to shift said brake shoe member.

4. An anti-backlash reel including heads, a revoluble spool between said heads, said spool having an end member in one of said heads, a flat brake shoe member against one of said heads and supported thereby for movement relative to the end member of said spool, said brake shoe member having a shoe extending into and normally engaging said spool, a spring holding the shoe of said brake shoe member against said spool, means operatable exterior of said reel and extending transversely of said spring adapted for regulating the action of said spring, and a line actuated bail adapted to shift said brake shoe member to disengage the shoe of said brake shoe member relative to the end of said spool.

5. An anti-backlash reel as called for in claim 4, wherein the first mentioned means is screwed in the reel head adjacent said spring.

6. An anti-backlash reel as called for in claim 5 wherein said bail has an end formation rockable in the reel head adjacent the end member of said spool to effect movement of said brake shoe member.

7. In an anti-backlash reel wherein a spool is driven by gearing within a reel head, and an anti-backlash mechanism in said reel head is bail actuated to control rotation of said spool;—a spring controlling the action of said anti-backlash mechanism, and means protruding into the outer wall of the reel head and transversely of said spring adapted to regulate the tension of said spring.

8. An anti-backlash reel as called for in claim 7 wherein said means includes a tapered member having a screw action in said reel head.

9. In a fishing reel having heads, a spool rotatable between the reel heads, said spool having an annular wall in one of said reel heads, a brake shoe between the annular wall of said spool and the axis of said spool and movable outwardly against said spool wall, a spring extending between said brake shoe and the axis of said spool and holding said brake shoe in engagement with the annular wall of said spool, and means shiftable in a direction parallel to the axis of said spool adapted for regulating the tension of said spring.

10. A fishing reel as called for in claim 10, wherein said means is screwed in the reel head adjacent the annular wall of said spool.

In testimony whereof I affix my signature.

WILLIAM SCHMID.